(12) United States Patent
Borden et al.

(10) Patent No.: US 9,048,636 B2
(45) Date of Patent: Jun. 2, 2015

(54) ELECTRICAL PEDESTAL

(75) Inventors: Kelly Borden, Nisku (CA); Dean Ruptash, Nisku (CA)

(73) Assignee: Cast-Perfect Products Inc., Nisku, Alberta (CA)

( * ) Notice: Subject to any disclaimer, the term of this patent is extended or adjusted under 35 U.S.C. 154(b) by 166 days.

(21) Appl. No.: 13/542,946

(22) Filed: Jul. 6, 2012

(65) Prior Publication Data

US 2013/0021721 A1      Jan. 24, 2013

(51) Int. Cl.
*H02G 9/00* (2006.01)
*H02B 1/50* (2006.01)
*H02K 5/02* (2006.01)

(52) U.S. Cl.
CPC ........................................ *H02B 1/50* (2013.01)

(58) Field of Classification Search
CPC .... H02G 9/00; H02K 11/0094; H05K 5/0247
USPC ......... 361/601, 622, 641, 624, 627, 634, 643, 361/652, 659–673; 174/37, 38, 48, 50, 174/58–60, 17 CT, 52 R, 541, 560; 312/223.2, 298, 223.6; D13/152, 184, D13/139.5
See application file for complete search history.

(56) References Cited

U.S. PATENT DOCUMENTS

| | | | |
|---|---|---|---|
| 3,843,182 A * | 10/1974 | Walls et al. .................... 293/122 |
| D237,718 S * | 11/1975 | Bozich ..................... D13/139.5 |
| 4,307,436 A * | 12/1981 | Eckart et al. .................. 361/652 |
| 4,519,657 A * | 5/1985 | Jensen .......................... 439/191 |
| D290,599 S * | 6/1987 | Wyatt .......................... D23/347 |
| 4,785,376 A * | 11/1988 | Dively .......................... 361/622 |
| 4,888,448 A * | 12/1989 | Moerman ....................... 174/38 |
| 4,951,182 A * | 8/1990 | Simonson et al. ............. 362/145 |
| 5,344,331 A * | 9/1994 | Hoffman et al. .............. 439/138 |
| 5,378,058 A * | 1/1995 | Tessmer ........................ 312/298 |
| 5,597,262 A * | 1/1997 | Beavers et al. ................... 404/6 |
| 5,696,493 A * | 12/1997 | Einck ........................... 340/623 |
| 5,747,592 A * | 5/1998 | Huff et al. ..................... 525/191 |
| 5,758,414 A * | 6/1998 | Ehrenfels ........................ 29/857 |
| D434,001 S * | 11/2000 | Sayger ..................... D13/139.5 |
| 6,614,204 B2 * | 9/2003 | Pellegrino et al. ............ 320/109 |
| 6,742,748 B1 * | 6/2004 | Gretz ............................ 248/156 |
| 7,041,719 B2 * | 5/2006 | Kriesel et al. ................. 524/114 |
| 7,218,511 B1 * | 5/2007 | Strozyk ........................ 417/44.1 |
| 7,361,832 B2 * | 4/2008 | Dively ............................ 174/38 |
| D608,733 S * | 1/2010 | Smith .......................... D13/107 |
| 7,849,617 B2 * | 12/2010 | Intagliata et al. ............... 40/608 |
| D632,645 S * | 2/2011 | Blain ........................... D13/107 |
| 8,051,947 B2 * | 11/2011 | Karayianni ................... 181/207 |
| 8,089,747 B2 * | 1/2012 | Storck et al. .................. 361/641 |
| 2004/0186258 A1 * | 9/2004 | Arai et al. ..................... 526/346 |
| 2008/0295375 A1 * | 12/2008 | Intagliata et al. ............... 40/608 |
| 2010/0107521 A1 * | 5/2010 | Hotchkin ..................... 52/169.9 |
| 2010/0230203 A1 * | 9/2010 | Karayianni ................... 181/207 |
| 2010/0296230 A1 * | 11/2010 | Storck et al. .................. 361/641 |
| 2011/0145141 A1 * | 6/2011 | Blain .............................. 705/39 |
| 2013/0221917 A1 * | 8/2013 | Kulkarni et al. .............. 320/109 |
| 2013/0234663 A1 * | 9/2013 | Kushalappa et al. ......... 320/109 |

* cited by examiner

*Primary Examiner* — Michail V Datskovskiy
(74) *Attorney, Agent, or Firm* — Bennett Jones LLP

(57) ABSTRACT

The invention is directed to an electrical pedestal comprising an elastomeric base and housing which are configured as one piece to together define a unitary hollow enclosure for accommodating one or more electrical components.

10 Claims, 3 Drawing Sheets

ELECTRICAL PEDESTAL

CROSS REFERENCE TO RELATED APPLICATIONS

This application claims the priority benefit of Canadian patent application 2,747,167 filed on Jul. 22, 2011 entitled "Electrical Pedestal", the contents of which are incorporated herein by reference.

FIELD OF THE INVENTION

The present invention is directed to an elastomeric electrical pedestal.

BACKGROUND OF THE INVENTION

Various power pedestals have been developed to provide safe, reliable means for users to access electricity at outdoor locations such as construction sites, camping/recreational vehicle parks, mobile home parks, and marinas. Power pedestals are thus constantly exposed to environmental conditions which make them prone to damage or electrical failure due to moisture. Power pedestals have been manufactured from a variety of materials such as, for example, lightweight composites, aluminum, steel, stainless steel, and iron-based metals. However, lightweight composites may not have sufficient mechanical strength to withstand impact, aluminum may corrode, and steel, stainless steel and iron-based metals are susceptible to rust. Chalking of materials may also be caused by UV sun rays.

In addition, power pedestals may have shapes, heights and configurations which are unsuitable for particular locations. Power pedestals having a short design (i.e., about 30 cm in height, 15 cm in width) are typically used for parking lot applications, but are not readily visible to drivers and are easily dented by vehicles. In winter, short pedestals may be completely covered by snow and damaged by moisture if they are not sufficiently waterproof. Further, the shortness and positioning of the electrical outlets sideways on such pedestals require users to stoop awkwardly to plug in their vehicles for electrical power, potentially causing back injuries.

Accordingly, there is thus a need in the art for improved power pedestals which may be suitable for a variety of locations.

SUMMARY OF THE INVENTION

The present invention is directed to an electrical pedestal. In one aspect, the invention comprises an electrical pedestal comprising an elastomeric base and housing which are configured as one piece to together define a unitary hollow enclosure for accommodating one or more electrical components.

In one embodiment, the housing comprises walls which project upwardly from the base and define the hollow enclosure. In one embodiment, the housing comprises a front wall, a rear wall, a first side wall, a second side wall, an open first end configured to accept a mounting bracket, and a second end which merges with the base. In one embodiment, the body is substantially rectangular-shaped comprising relatively planar front, rear, and side walls.

In one embodiment, at least one wall defines a window sized to substantially conform to the size of an electrical outlet cover, and apertures centered above and below the window to attach the electrical outlet cover to the wall. In one embodiment, a pair of walls defines opposing windows.

In one embodiment, the pedestal has a height ranging from about one to about six feet. In one embodiment, the height ranges from about two to about five feet. In one embodiment, the height ranges from about three to about four feet.

In one embodiment, the elastomeric base and housing comprise a polyurethane. In one embodiment, the base and housing comprise a polyurethane having a hardness between about 60 to about 100 on the Shore D durometer scale. In one embodiment, the polyurethane has a hardness of about 75 on the Shore D durometer scale.

In one embodiment, the base is substantially horizontal and defines a plurality of apertures to receive fasteners for securing the pedestal to a support surface.

In one embodiment, the pedestal further comprises one or more of warning indicia displayed on one or more walls, a safety switch, an impact trip switch, lighting, a surveillance feature, or an alarm.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

The present invention relates to an electrical pedestal. Any term or expression not expressly defined herein shall have its commonly accepted definition understood by those skilled in the art. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

The present invention comprises an electrical pedestal (1). The electrical pedestal (1) is configured to provide ready-to-use electricity, particularly in an outdoor environment. As used herein, the term "outdoor environment" broadly refers to any outdoor environment such as, for example, a construction site, camping or recreational vehicle site, dock or pier of a marina, mobile home or trailer park, parking spot, and other area where electricity is needed. With the exception of a mounting bracket and electrical components as described herein, the electrical pedestal (1) is of one-piece construction, and is entirely hollow to enclose one or more electrical components to provide electricity to a device to be powered.

The invention will now be described having reference to the accompanying figures. The pedestal (1) is shown generally in the Figures to include an elongated housing (10) which extends upwardly from a base (12). The housing (10) and base (12) are configured as one piece to together define a unitary hollow enclosure (14) for one or more electrical components. As used herein, the term "electrical component" includes, but is not limited to, power receptacles, electric meters, circuit breakers, transformers, relays, light fixtures, telephone or Internet service lines, television cables, and the like. Electrical components may be run from a substation to beneath the pedestal (1), and extend within the enclosure (14) upwardly through the base (12) and housing (10).

Figure 2:
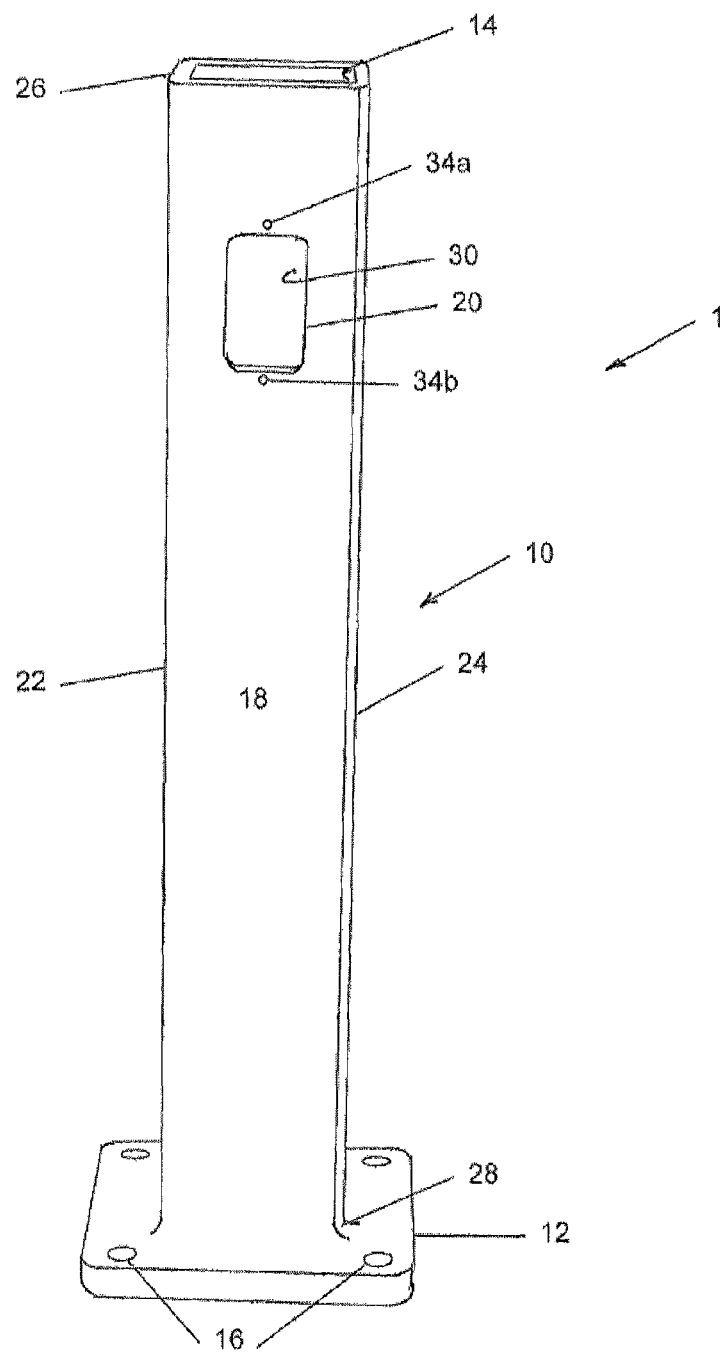
FIG. 2 is a drawing showing a front view of one embodiment of an electrical pedestal of the present invention.

In one embodiment, the base (12) is substantially horizontal. As used herein, the term "horizontal" means a plane that is substantially parallel to the plane of the horizon. The term "vertical" means a plane that is at a right angle to the horizontal plane. As shown in FIG. 2, a substantially horizontal base (12) provides a relatively flat surface for the pedestal (1) to rest on any underlying horizontal support surface. As used herein, the term "support surface" includes, but is not limited to, a horizontal flat surface, platform, dock, pier, and the like. The base (12) may be of any shape. In one embodiment, the base (12) of the pedestal (1) may be substantially square in shape. In one embodiment, the base (12) defines a plurality of apertures (16) through which bolts (not shown) may be threaded to secure the pedestal (1) to the support surface. Other suitable fasteners other than bolts are well known to those skilled in the art such as, for example, pins, screws, and rivets. If desired, the pedestal (1) can be permanently attached if the pedestal (1) is to be used regularly in a particular location.

The housing (10) of the pedestal (1) comprises walls (18, 20, 22, 24) which project upwardly from the base (12) and define the hollow enclosure (14). In one embodiment, the housing (10) comprises a front wall (18), a rear wall (20), a first side wall (22), and a second side wall (24). The housing (10) has an open first end (26) and a second end (28) which merges with the base (12). The open first end (26) facilitates installation of the electrical components and allows access to the components within the housing (10).

In one embodiment, a wall (18) of the pedestal (1) defines a window (30) sized to substantially conform to the size of an electrical outlet cover (32), and apertures (34a, 34b) centered above and below the window (30) to attach the electrical outlet cover (32) to the wall (18, 20, 22, 24). In one embodiment, it is preferred that the electrical outlet cover (32) is positioned upright rather than sideways, as shown in the prior art pedestal of FIG. 1.

In one embodiment, each of the front and rear walls (18, 20) or each of the side walls (22, 24) define opposing windows (30) to provide a "back to back" configuration appropriate for sites (for example, on camping grounds) which are across from each other, or side by side. The "back to back" configuration conveniently omits the need for two single pedestals (1).

The shape of the pedestal (1) is not limited to that of the present example, but may variously be changed, for example, into a square, parallelogram, or the like. In one embodiment, the housing (10) of the pedestal (1) may be substantially rectangular-shaped comprising planar front, rear and side walls (18, 20, 22, 24).

The dimensions are not essential to the invention and are dictated by the intended use and location. The dimensions of the pedestal (1) may be increased or decreased as may be required to satisfy any particular design objectives; for example, the pedestal (1) may be available in a variety of dimensions. In one embodiment, the pedestal (1) has a height sufficient to enable a user (for example, an elderly, infirmed or disabled individual) to plug in a device comfortably without having to bend over or to overstretch to reach the electrical outlets (38). Preferably, the pedestal (1) has a height sufficient to render the pedestal (1) visible for example, to drivers in recreational vehicles. In one embodiment, the pedestal (1) ranges from about one to about six feet in height, preferably about two to about five feet, and most preferably about three to about four feet.

The pedestal (1) can be constructed from any material or combination of materials having suitable properties such as, for example, mechanical strength, ability to withstand cold and adverse environmental conditions, corrosion resistance, and ease of molding. In one embodiment, the pedestal (1) comprises an elastomer. As used herein, the term "elastomer" means a material which exhibits the property of elasticity, namely the ability to deform when a stress is applied and to recover its original form (i.e., length, volume, shape, etc.) when the stress is removed. Elastomers typically have a low Young's modulus (i.e., the ratio of tensile stress to tensile strain, expressed in units of pressure), and a high yield strain (i.e., the stress at which a material begins to deform plastically, expressed in units of pressure). Suitable elastomers for use in the present invention may include, for example, thermoplastic elastomers including, but not limited to, styrenic block copolymers, polyolefins, polyurethanes, polyesters and polyamides.

In one embodiment, the pedestal (1) comprises a polyurethane of suitable hardness. In one embodiment, the pedestal (1) comprises a polyurethane having a hardness between about 60 to about 100 on the Shore D durometer scale. Preferably, the polyurethane has a hardness of about 75 on the Shore D durometer scale. Since the pedestal (1) itself is of suitable hardness and impervious to corrosion, it is far less susceptible to environmental or structural damage.

The pedestal (1) may be formed by a blow molding process including, but not limited to, extrusion blow molding, injection blow molding, stretch blow molding, and other processes known in the art which create hollow items. Briefly, the material (for example, elastomer) of which the pedestal (1) is to be formed is melted and formed into a parison, namely a hollow tube having an opening at one end to allow entry of pressurized gas (for example, air). The parison is loaded onto a stand and encircled by two sides of a pedestal-shaped mold. The pressurized gas is blown into the perform to expand and press it against the sides of the mold cavity to form the shape of the pedestal (1). The pressure is held until the material cools. Once the material has hardened, the two halves of the mold are separated, and the finished pedestal (1) is released. Blow molding is a relatively simple and rapid process for producing the pedestal (1).

Figure 1:
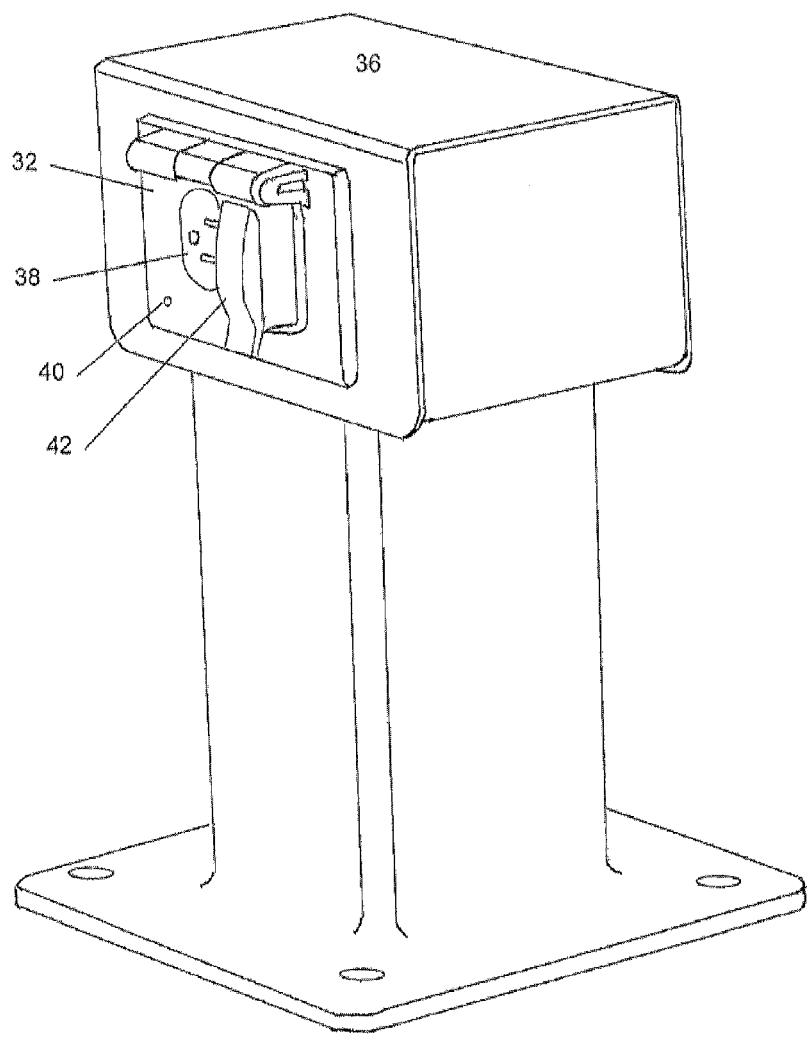
FIG. 1 is a drawing showing a side view of a conventional, prior art power pedestal equipped with a mounting bracket and a duplex electrical outlet.
Figure 3:
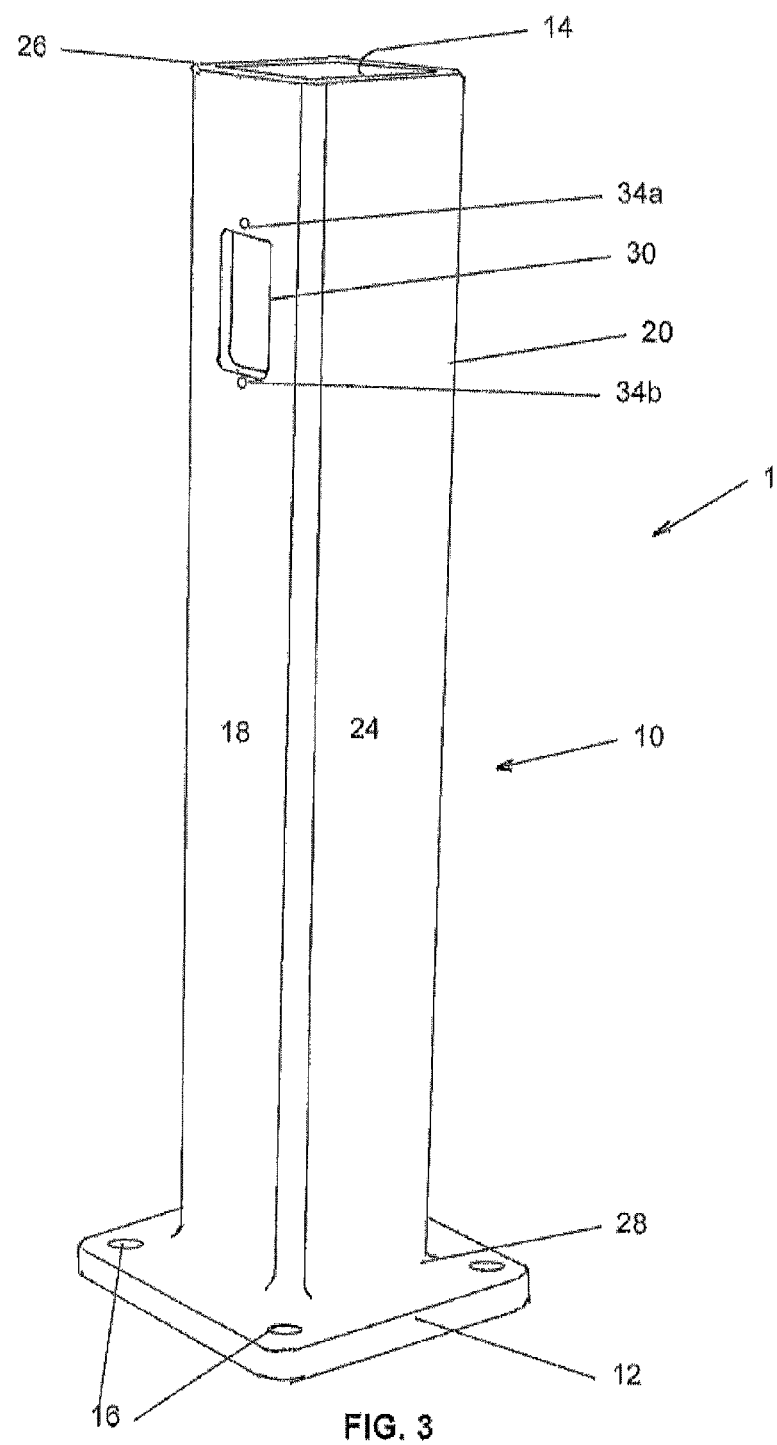
FIG. 3 is a drawing showing a side view of the electrical pedestal of FIG. 2.

As shown in FIGS. 2 and 3, the pedestal (1) is molded as a single, integral unit combining the housing (10) and the base (12). As shown in FIG. 1, a mounting bracket (36), electrical outlets or receptacles (38), and electrical outlet cover (32) in the prior art are manufactured separately as components which are removably attachable to the pedestal (1).

Once the desired electrical components have been installed within the pedestal (1), the mounting bracket (36) may be removably attached to seal the pedestal (1), thereby protecting the internal electrical components, or detached to allow access to the components for inspection, repair, or installation of additional components if necessary. The mounting bracket (36) is mounted over the open first end (26) of the housing (10).

One or more electrical receptacles (38) which are wired into the electrical system of the pedestal (1) extend through apertures (not shown) within the mounting bracket (36). Electrical receptacles (38) are commercially available in a variety of configurations. The receptacles (38) of the present invention are not limited to the receptacles having the configuration illustrated. A standard North American electrical receptacle accommodates a three prong plug of a device. The electrical receptacle comprises a pair of parallel slits less than about 2.5 cm apart, one being the hot slit which conducts electricity through the plug to the device being powered, and the other being the neutral slit. An arch-shaped opening centered below the parallel slits accepts the bottom prong of the plug to ground the device. One skilled in the art will recognize that there are significant differences in electrical receptacles depending upon the voltage of the current and difference in the frequency of the electric power used in various countries; for example, the standard in North America is 110-120 volts and 60 Hz, while the European standard is 220-240 volts and 50 Hz. Such differences necessitate distinct configurations of electrical receptacles.

As shown in FIG. 1, the mounting bracket (36) in the prior art has attachment elements (40) to releasably attach the electrical outlet cover (32) over the receptacles (38). Receptacle covers (42) may be included to protect the receptacles (38) against inclement weather conditions or damp areas (e.g., sprinkler system, landscape lighting, holiday lights). Receptacle covers (42) typically comprise a hinged cover which is under tension to ensure proper closing pressure when the receptacle (38) is or is not in use. Receptacle covers (42) may be formed of thermoplastic, cast aluminum, or other suitable materials known in the art.

The pedestal (1) of the present invention may be used in a variety of situations. Preferably, the pedestal (1) may be used to provide electricity for outdoor environments including, but not limited to, construction sites, camping or recreational vehicle sites, docks, piers, mobile home or trailer parks, parking spots, parks, sports fields, golf courses, and the like. It will be appreciated by those skilled in the art that the pedestal (1) of the present invention may be equipped with utility hookups other than electrical components such as, for example, water connections and sewer pump-out service. Separation of power, communication circuitry, or fresh/grey water connections may be required when supplied within the same pedestal (1). Further, the pedestal (1) may incorporate warning indicia displayed on any outer wall (18, 20, 22, 24) of the pedestal (1), safety switches, impact trip switches, lighting, surveillance features such as a remotely controlled camera, alarms for impact, fire, theft, and bilge, and the like.

As will be apparent to those skilled in the art, various modifications, adaptations and variations of the foregoing specific disclosure can be made without departing from the scope of the invention claimed herein.

What is claimed is:

1. An electrical pedestal comprising a base and housing which are configured as one piece made of a thermoplastic elastomer defining a unitary hollow enclosure for accommodating one or more electrical components, wherein the housing:
   (a) comprises walls which project upwardly from the base and define the hollow enclosure; and
   (b) defines an open first end and at least one electrical outlet window, and no other opening; and
   (c) the hollow enclosure defines an unobstructed path from the base to the open first end.

2. The pedestal of claim 1, wherein a pair of walls defines opposing electrical outlet openings, each opening comprising a window sized to substantially conform to the size of an electrical outlet cover.

3. The pedestal of claim 1, wherein the body is substantially rectangular-shaped comprising relatively planar front, rear, and side walls.

4. The pedestal of claim 1, having a height ranging from about one to about six feet.

5. The pedestal of claim 4, wherein the height ranges from about two to about five feet.

6. The pedestal of claim 4, wherein the height ranges from about three to about four feet.

7. The pedestal of claim 1, wherein the elastomeric base and housing comprise polyurethane.

8. The pedestal of claim 7, wherein the thermoplastic elastomer comprises a polyurethane having a hardness between about 60 to about 100 on the Shore D durometer scale.

9. The pedestal of claim 8, wherein the polyurethane has a hardness of about 75 on the Shore D durometer scale.

10. The pedestal of claim 1, wherein the base is substantially horizontal and defines a plurality of apertures to receive fasteners for securing the pedestal to a support surface.

* * * * *